(12) United States Patent
Wegner

(10) Patent No.: US 6,463,287 B1
(45) Date of Patent: *Oct. 8, 2002

(54) APPARATUS METHOD AND SYSTEMS RELATING TO A WIRELESS GEOGRAPHICAL POSITIONING SYSTEM INCLUDING A SYSTEM FOR MONITORING AND ANALYZING CHARACTERISTICS OF A WIRELESS TELECOMMUNICATIONS NETWORK

(75) Inventor: David Charles Wegner, Garland, TX (US)

(73) Assignee: Ericsson Inc., Plano, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/223,300

(22) Filed: Dec. 30, 1998

(51) Int. Cl.[7] .................................................. H04Q 7/20
(52) U.S. Cl. ........................ 455/456; 455/404; 455/560
(58) Field of Search ............................... 455/456, 457, 455/404, 560, 521; 701/207, 209, 213

(56) References Cited

U.S. PATENT DOCUMENTS

| | | | | |
|---|---|---|---|---|
| 6,002,936 A | * | 12/1999 | Roel-Ng et al. | ............ 455/456 |
| 6,073,004 A | * | 6/2000 | Balachandran | ............... 455/404 |
| 6,091,956 A | * | 7/2000 | Hollenberg | .................. 455/456 |
| 6,119,013 A | * | 9/2000 | Maloney et al. | ............. 455/456 |
| 6,128,481 A | * | 10/2000 | Houde et al. | ................ 455/404 |
| 6,138,026 A | * | 10/2000 | Irvin | .......................... 455/456 |
| 6,360,102 B1 | * | 3/2002 | Havinis et al. | ............. 455/457 |

* cited by examiner

Primary Examiner—Edward F. Urban
Assistant Examiner—Temica M. Davis
(74) Attorney, Agent, or Firm—Roger S. Burleigh; Ericsson Inc.

(57) ABSTRACT

Apparatus, methods and systems related to, or employing, an event detector that causes a wireless telecommunications network to trigger a request to a wireless positioning system upon detecting a predefined event associated with a Mobile System (MS); the wireless positioning system is operable to determine and communicate the geographic location of the MS to the wireless telecommunications network in response to receiving the request. A system for monitoring and analyzing characteristics of a wireless telecommunications network can advantageously employ the event detector to log data associated with each occurrence of a predefined event. The data can be displayed on a video terminal, for example, as a graphical representation of the data; the graphical representation can be an overlay of the data on a topographical representation of at least a portion of the wireless telecommunications network, whereby the characteristics can be used to troubleshoot and/or improve the operation of the wireless telecommunications network.

31 Claims, 5 Drawing Sheets

PRIOR ART 100

FIG. 4
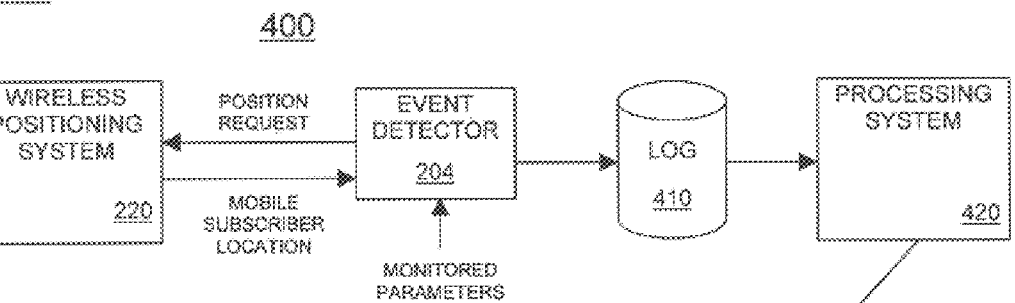
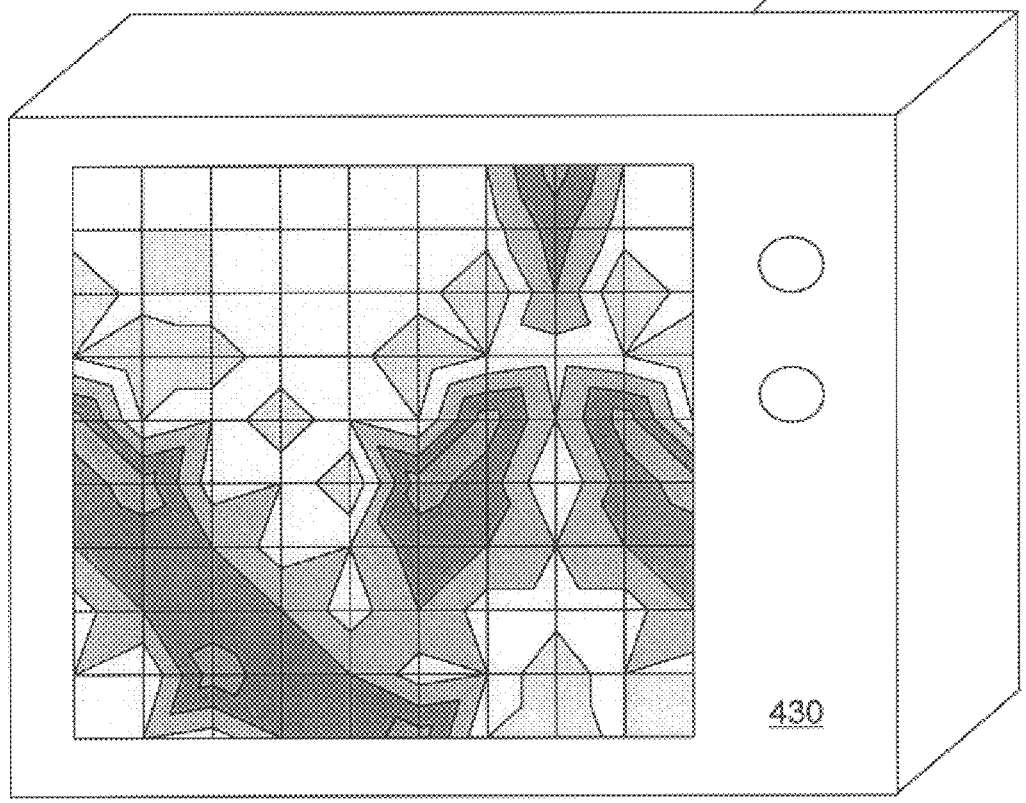

APPARATUS METHOD AND SYSTEMS RELATING TO A WIRELESS GEOGRAPHICAL POSITIONING SYSTEM INCLUDING A SYSTEM FOR MONITORING AND ANALYZING CHARACTERISTICS OF A WIRELESS TELECOMMUNICATIONS NETWORK

TECHNICAL FIELD OF THE INVENTION

The present invention is directed, in general, to wireless communications systems and, more specifically, to apparatus, methods and systems relating to a wireless geographic positioning system, including a system for monitoring and analyzing characteristics of a wireless telecommunications network.

BACKGROUND OF THE INVENTION

The world is currently experiencing revolutionary changes in communications systems, brought about, in part, by the general availability and evolution of wireless telephony systems. Immediately after the first mobile user headed off into the sunset with a cellular telephone, or Mobile Station (MS), however, someone else wondered where they went. Unlike conventional wireline telephones, wireless callers are not usually associated with a fixed location, which provides many benefits such as freedom of use over large geographical areas. Because the location of a Mobile Station (MS), or wireless device in general, is usually not fixed, however, such freedom can be a detriment to a cellular user, such as when a user requires emergency assistance. For example, in a conventional wireless network, the location of a MS can not be determined when a user places a call to a public safety answering point (PSAP), such as a call to "911."

Across the United States, various public safety agencies have reported that 911 calls from cellular telephones now constitute between 15 percent and 40 percent of all 911 calls received; recent statistics indicate that over 7 million cellular 911 calls are placed per year. Although public safety agencies desire to provide the same level of service to cellular callers as they do to landline callers, they are hampered by a great divergence in technology. The issue of supporting cellular 911 calls has become serious enough that on Feb. 12, 1998, the Federal Communications Commission (FCC) and the Cellular Telephone Industry Association (CTIA) announced an agreement on a five-year implementation plan for deploying geographical location systems within all wireless networks.

In response to the FCC/CTIA implementation plan, various systems for providing the geographic location of MSs have been developed or proposed. The systems are generally network-based solutions that "overlay" a wireless carrier's existing network. As an overlay system, such systems monitor the numbers of all calls placed from MSs within a wireless network and, upon detecting a 911 call, initiate a procedure to determine the approximate geographic location of the MS. A particular problem with such systems is that they are generally independent systems that receive little or no assistance from an existing wireless network and, thus, require a great deal of hardware that is redundant to that already available in a wireless network.

In addition to the desire to provide geographic location information for a MS placing a 911 call, the availability of such information can also make possible many advanced services, such as location-sensitive billing, vehicle and fleet management, and inventory/package monitoring. Although the capability to provide such advanced services will allow service providers to recoup some of the investment that must be made to comply with the FCC/CTIA requirement for the geographic location of 911 calls, a service provider's return-on-investment will be maximized only if less-complex systems are developed. Accordingly, what is needed in the art are improved systems and methods for providing geographic location information for MSs in a wireless network; in particular, there is a need for geographical positioning systems that take advantage of the existing infrastructure of wireless networks and which provide the capability to offer premium services and/or improve the operation of wireless networks.

SUMMARY OF THE INVENTION

To address the above-discussed deficiencies of the prior art, the present invention relates to apparatus, methods and systems employing an event detector integral to a wireless telecommunications network that causes the network to trigger a request to a wireless positioning system upon detecting a predefined event associated with a Mobile System (MS); the wireless positioning system is operable to determine and communicate the geographical location of the MS to the wireless network in response to receiving the request. Integrating an event detector within a wireless telecommunications network reduces the hardware, and processing load, associated with conventional "overlay" geographic positioning systems. Furthermore, an integral event detector provides the capability to offer premium services, and can be used in a system designed to improve the operation of wireless networks Unlike conventional implementations of geographic positioning systems which, for example, monitor all calls from MSs to determine whether a call is being placed to a public safety answering point (PSAP), such as a call to "911," an integral event detector can take advantage of the existing infrastructure of wireless networks, and the operational data available therein. For example, the integral event detector can selectively trigger a request for the geographic location of a MS based on various predefined events, such as the origination of a wireless call by or to a MS, the termination of a wireless call by or to a MS (including "dropped calls"), and many other events associated with a MS.

A system according to the principles disclosed herein can be implemented to meet the FCC/CTIA plan for deploying geographical location systems within all wireless networks. For example, a predefined event can be associated with a predefined called number, such as "911."

As more fully described hereinafter, the principles disclosed herein can be employed in a conventional wireless telecommunications network, such as a Public Land Mobile Network (PLMN); the invention, however, is not limited to use in terrestrial-based telecommunications systems. In preferred embodiments, the event detector is a computer processing system; in related embodiments, a conventional computer processing system in a Mobile-services Switching Center (MSC) can be programmed to provide the functions disclosed herein.

The integral event detector and principles disclosed herein can be advantageously employed in a system for monitoring and analyzing characteristics of a wireless telecommunications network. In such embodiments, a log (e.g., non-volatile computer storage, such as a magnetic storage medium) is provided for storing a plurality of records containing data associated with each occurrence of a predefined event. The records can contain data such as the type of event, the time of occurrence of the event, and the geographic location of a MS at the time of occurrence of the event. Furthermore, a predefined event can be associated with a threshold value of a parameter, such as a received signal strength associated with a MS, a bit error rate associated with a MS, or a rate of occurrence of a predefined event.

In a preferred embodiment, a system for monitoring and analyzing characteristics of a wireless telecommunications network includes a video terminal for displaying a graphical representation of the data associated with each occurrence of a predefined event. A graphical representation can be, for example, an overlay of the data on a topographical representation of at least a portion of a wireless telecommunications network, such as a geographic region within a particular network cell. In such embodiments, the system can be used to monitor and analyze geographic regions within the wireless telecommunications network that may have, for example, a high rate of "dropped calls" due to antenna occlusions in certain regions; remedial steps can then be taken to improve the operation of the wireless telecommunications network in the identified region.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which:

FIG. 4 illustrates an exemplary system for monitoring and analyzing characteristics of a wireless telecommunications network employing an integral event detector and a wireless geographical positioning system.

DETAILED DESCRIPTION

Figure 1:
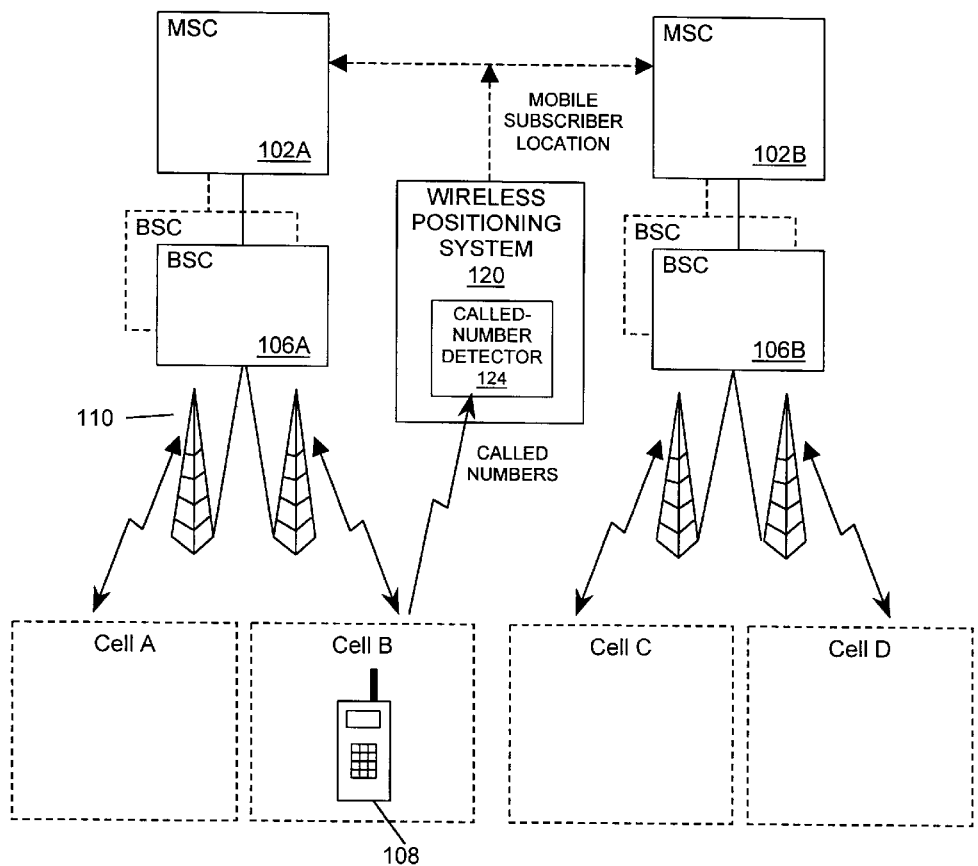
FIG. 1 illustrates a conventional wireless telecommunications network in combination with a wireless geographical positioning system.

In order to understand better the features and advantages of the present invention, reference is made first to FIG. 1, which illustrates a conventional wireless telecommunications network in combination with a wireless geographical positioning system, jointly referenced as system 100. A conventional wireless telecommunications network includes one or more Mobile-services Switching Centers (MSCs), such as MSC 102A and 102B, each of which are associated with one or more Base Station Subsystems (BSSs). A BSS includes one or more Base Station Controllers (BSCs), such as BSC 106A and 106B, each of which is associated with one or more Base Transceiver Stations (BTSs), generally designated 110. Each BTS has a geographical service area referred to as a "cell," and a Mobile Station (MS), such as MS 108, communicates with the network through radio communications with the various BTSs as the MS physically moves from one cell to another, such as from Cell B to Cell C.

Although it is possible for a wireless telecommunications network to identify the location of a MS as being within the geographical area of a particular cell and sector, the size of such cells can be many square miles and, thus, it is not possible for the telecommunications network to precisely determine the physical location of a MS. To provide more accurate information regarding the location of a MS, a wireless telecommunications network must rely on the services of a wireless positioning system 120. A wireless positioning system 120 can use various techniques, such as Time Difference of Arrival (TDOA) or Angle of Arrival (AOA), to identify the approximate physical location of a MS. As previously described, a wireless positioning system is typically a network-based solution that "overlays" a wireless carrier's existing network.

As an overlay system, the wireless positioning system 120 monitors the dialed numbers of all calls using a called-number detector 124. Upon detecting, for example, a 911 call, the wireless positioning system 120 initiates a procedure to determine the approximate geographic location of the MS. The wireless positioning system 120 can then communicate the MS location to the wireless telecommunications network. Alternatively, or in addition, the wireless positioning system 120 can communicate the MS location directly to a public safety answering point (PSAP) or any other location, either through the wireless telecommunications network or via the public switched telephone network (PSTN). A particular problem with such wireless positioning systems is that they are typically independent systems that receive no assistance from an existing wireless network and, thus, require a great deal of hardware, or processing resources, that is redundant to that already available in a wireless network. For example, a MSC has the capability to determine the called number of a call placed from a MS 108 and, thus, a called-number detector 124 in wireless positioning system 120 is redundant. The disadvantages of the prior art can be overcome using the principles disclosed hereinafter, and such principles can further provide the capability to offer improved services to mobile subscribers and means for improving the operation of wireless telecommunications networks.

Figure 2:
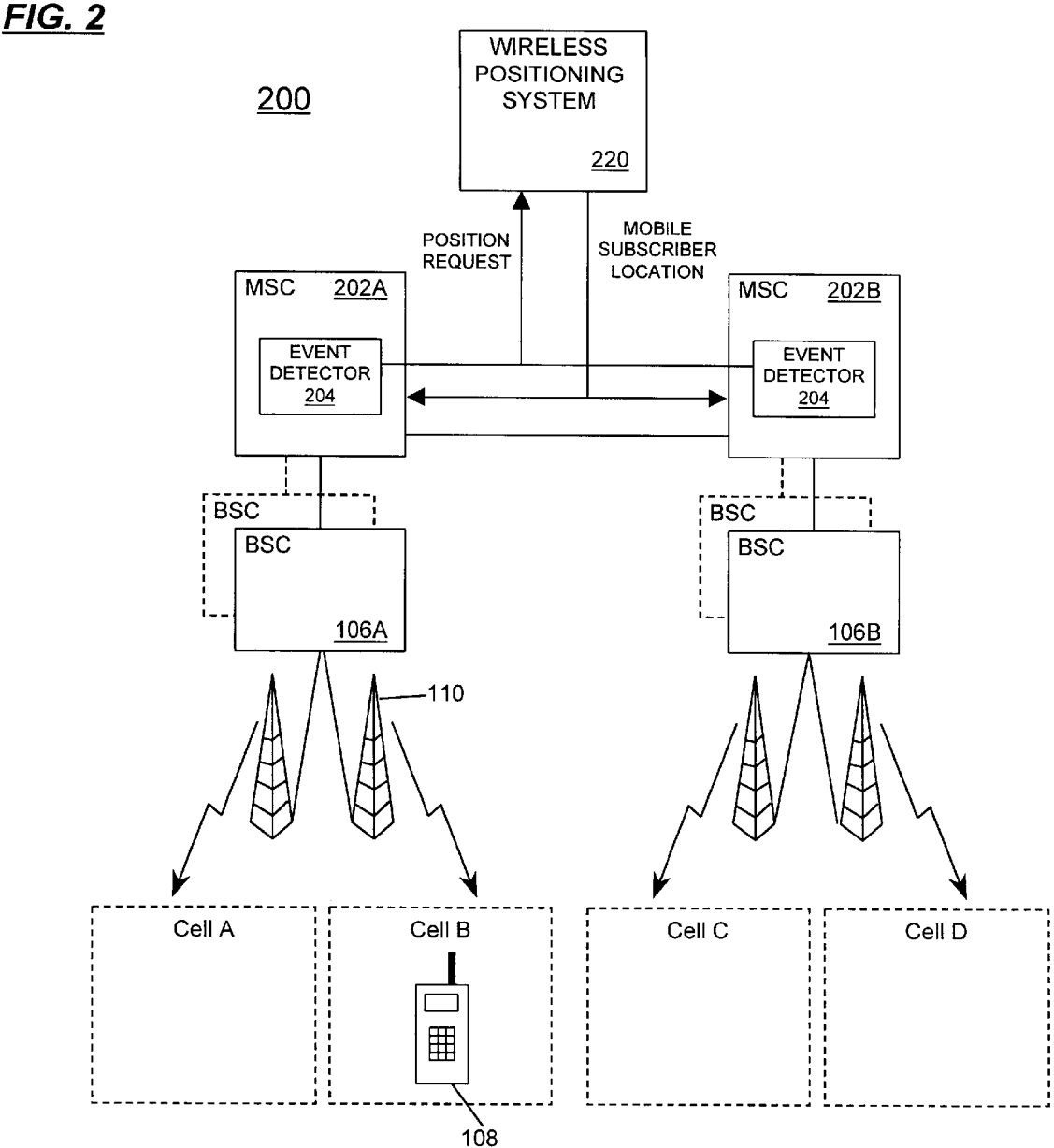
FIG. 2 illustrates an exemplary wireless telecommunications network employing an integral event detector to trigger the operation of a wireless geographical positioning system.

Referring now to FIG. 2, illustrated is an exemplary wireless telecommunications network employing integral event detectors 204, according to the principles disclosed herein, to trigger the operation of a wireless geographical positioning system 220. The wireless telecommunications network and wireless geographical positioning system illustrated in FIG. 2, jointly referenced as system 200, is substantially similar to system 100, except that wireless positioning system 220 does not include a called-number detector 124 and each MSC includes an event detector 204.

As noted previously, a conventional MSC has the integral capability to detect the called number of a call placed from a MS 108. In addition to the capability of detecting called numbers, a MSC has the further capability to detect various other "events" that are not readily accessible to a conventional "overlay" wireless positioning system. For example, the integral event detector 204 can monitor for the occurrence of events such as the origination of a wireless call by a MS, the origination of a wireless call to a MS, the termination of a wireless call by a MS (including a "dropped call"), the termination of a wireless call to a MS, and many other user-definable events associated with a MS. In addition, a MSC has access to operational parameters such as a received signal strength associated with a MS, a bit error rate associated with a MS, or a rate of occurrence of a predefined event (e.g., the frequency of "dropped calls" within a cell).

Employing the principles disclosed herein, any "event" or "parameter" available to a MSC, or other component, within a wireless telecommunications network can be used to selectively trigger a request to a wireless positioning system to obtain the geographic location of a MS. As used herein, "event" is broadly defined as the occurrence of any predefined action, or reaction, within a wireless telecommunications network, such as the origination or termination of a wireless call by a MS, the origination or termination of a wireless call to a MS; such events may also include an occurrence intermediate to the origination and termination of a call, such as a "dropped call," or an action taken by a mobile subscriber during a call, such as pressing a button on a MS to request the user's current location. In addition to capabilities unknown to prior art wireless positioning systems, a system according to the principles disclosed herein can be implemented to meet the FCC/CTIA plan for deploying geographical location systems within all wireless networks; for example, a predefined event can be associated with a predefined called number, such as "911."

Because a wireless telecommunications network also monitors certain operational characteristics, or "parameters," associated with the network and with MSs communicating with the network, an "event" can also be associated with a value of a parameter. Thus, as used herein, "parameter" is broadly defined as any characteristic of a wireless network or MS, including a received signal strength (at either a MS or as received by the network from a MS), a bit error rate (for either a forward or return link associated with a MS). A "parameter" can also be a rate of occurrence of a predefined event, such as the frequency of "dropped calls" within a network cell or sector.

As more fully described hereinafter, the principles disclosed herein can be employed in a conventional wireless telecommunications network, such as a Public Land Mobile Network (PLMN); the invention, however, is not limited to use in terrestrial-based wireless telecommunications systems, or to terrestrial-based wireless positioning systems. In preferred embodiments, the event detector 204 is a computer processing system; in terrestrial-based embodiments, a conventional computer processing system in a Mobileservices Switching Center (MSC) can be programmed to provide the event detector functions disclosed herein. Furthermore, if a MS is equipped with Global Positioning System (GPS) capabilities, the wireless positioning system can be the satellite-based GPS. In GPS-based embodiments, a request for position of the MS could be generated by a MSC and transmitted to the MS; the MS could obtain its location using its GPS capabilities, and then relay the location information to the MSC. Those skilled in the art will readily conceive of other system configurations that can be adapted to employ the principles disclosed herein; all such embodiments are intended to be within the scope of the claims recited hereinafter.

Figure 3:
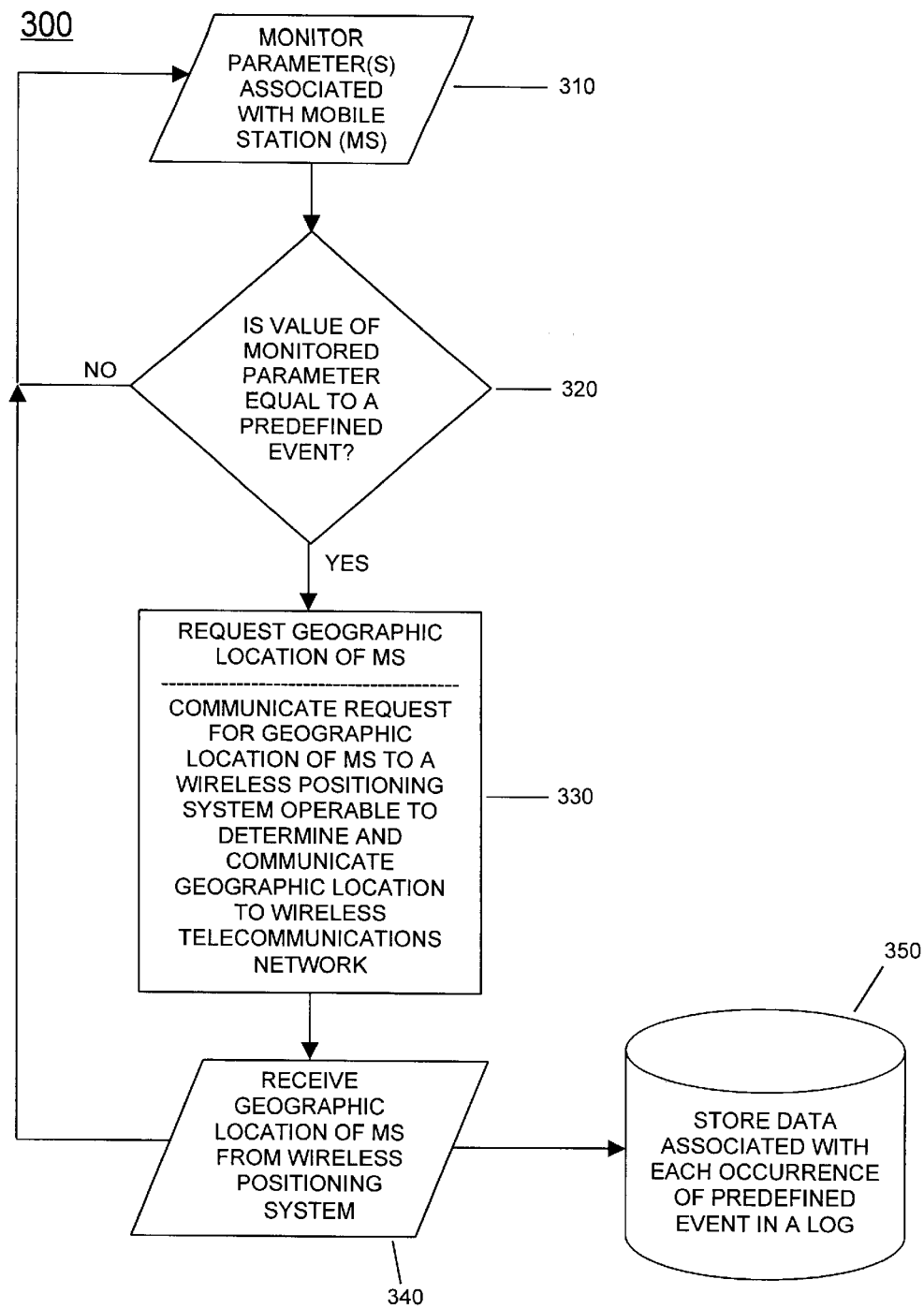
FIG. 3 illustrates an exemplary method for determining a geographical location of a Mobile Station (MS) in a wireless telecommunications network according to the principles of the present invention.

Referring now to FIG. 3, illustrated is an exemplary method 300 for determining a geographical location of a Mobile Station (MS) in a wireless telecommunications network according to the principles of the present invention. In a Step 310, the wireless telecommunications network monitors parameter(s) associated with a MS. The monitoring function can be implemented at any desired location in the network; in a conventional GSM network, a computer processing system in a MSC can easily be adapted to provide monitoring of such parameter(s).

In a Step 320, it is determined whether a predefined event is equal to the value of a monitored parameter. As used herein, "equal" is defined to mean that (i) a predefined event is equivalent to the value of a parameter; (ii) the value of a parameter is within a range of values associated with a predefined event, e.g., a predefined event may be defined as a threshold value of a parameter, in which case, if the parameter exceeds the threshold value, the predefined event is logically true; or (iii) a predefined event is equal to a function of the value of a parameter. If the monitored parameter is equal to a predefined event, the wireless telecommunications network issues, or "triggers," a request for the geographic location of the MS (Step 330). For example, in a GSM network, a MSC 202A or 202B, as shown in FIG. 2, can communicate a position request for the geographic location of a MS to a wireless positioning system 220; a position request should include information to instruct the wireless positioning system as to the identity of the MS for which position information is desired. The wireless positioning system then determines and communicates the geographic location of the MS to the wireless telecommunications network, e.g., to the MSC 202A or 202B that issued the request.

In a step 340, the wireless telecommunications network (e.g., at a MSC) receives the geographic location of the MS from the wireless positioning system 220. The geographic location can then be used by a local application or communicated to a remote system. If desired, a Step 350 can be provided to store, or "log," data associated with each occurrence of a predefined event; a log is preferably a form of non-volatile memory, such as a magnetic storage medium.

Referring now to FIG. 4, illustrated is an exemplary system 400 for monitoring and analyzing characteristics of a wireless telecommunications network employing an integral event detector and a wireless geographical positioning system. The system 400 includes an event detector 204 and wireless positioning system 220, as previously described with reference to FIG. 2, and a log 410, as described with reference to FIG. 4. The system 400 further includes a processing system 420, such as a general or special-purpose computing system and, preferably, a video display terminal 430. As more fully described with reference to FIG. 5, the processing system 420 is operative to retrieve data associated with each occurrence of a predefined event from log 410, process such data to analyze various characteristics of a wireless telecommunications network and, if available, display various representations of such data on video display terminal 430.

Figure 5:
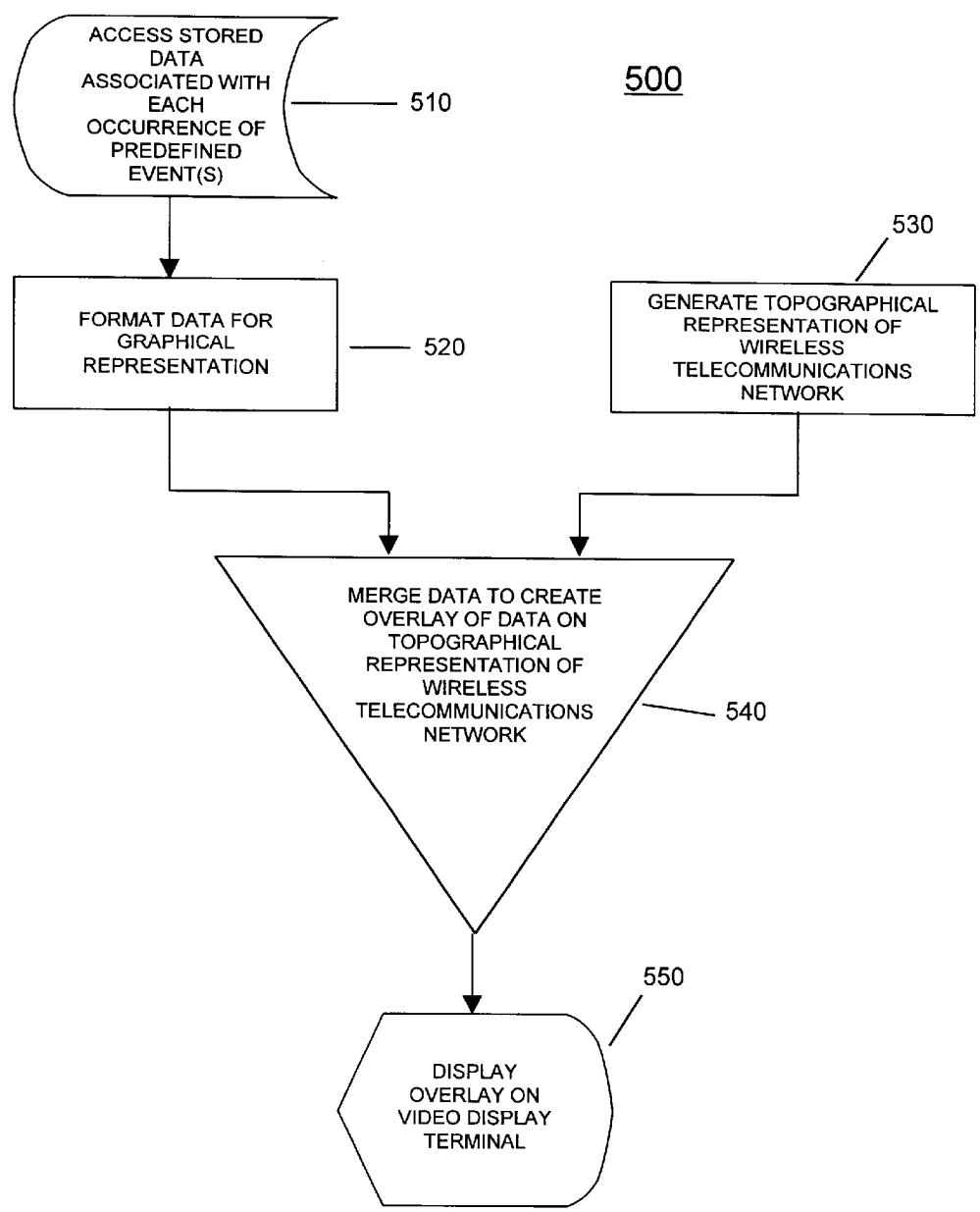
FIG. 5 illustrates an exemplary method for monitoring and analyzing characteristics of a wireless telecommunications network using the exemplary system illustrated in FIG. 4.

Finally, referring to FIG. 5, illustrated is an exemplary method 500 for monitoring and analyzing characteristics of a wireless telecommunications network using the exemplary system illustrated in FIG. 4. Exemplary method 500 depends upon, for example, the process illustrated in FIG. 3 for monitoring and storing data associated with each occurrence of a predefined event in log 410. The method 500 is executed in processing system 420; processing system 420 can be, for example, a computer processing system found in conventional MSCs in a GSM network. In a Step 510, the processing system 420 accesses log 410 to retrieve data associated with each occurrence of a predefined event.

As previously noted, the records stored in log 410 can contain data related to each event, such as the type of event, the time of occurrence of the event, and the geographic location of a MS at the time of occurrence of the event, or an event can be associated with a threshold value of a parameter, such as a received signal strength associated with a MS, a bit error rate associated with a MS, or a rate of occurrence of a predefined event. The data for one or more events can be analyzed by the processing system 420 according to any desired criteria or procedure. Based on the processing of the data, alerts can be issued to signal any undesired system characteristic, such as frequent "dropped calls" within a portion of the network geographical service area. In addition, the operation of the wireless telecommunications network can be automatically altered under the control of processing system 420 to improve its performance; e.g., if "dropped calls" frequently occur in a particular geographic region and the received signal strength reported by MSs in such region is low, the processing system 420 can direct or cause the BTS serving such region to increase its transmitter power. Those skilled in the art will readily conceive of other advantageous uses for the data related to each event stored in log 410.

In a preferred embodiment, a system for monitoring and analyzing characteristics of a wireless telecommunications network includes a video display terminal for providing a graphical representation of the data associated with each occurrence of a predefined event. A graphical representation can be, for example, an overlay of the data on a topographical representation of at least a portion of a wireless telecommunications network, such as the geographic region within a particular network cell. In such embodiments, the system can be used to monitor and analyze geographic regions within the wireless telecommunications network that may have, for example, a high rate of "dropped calls" due to antenna occlusions; remedial steps can then be taken to improve the operation of the wireless telecommunications network in the identified region.

In a system employing a video display terminal, the processing system 420 can, in a Step 520, format the data associated with each occurrence of a predefined event for graphical representation on the terminal. In addition, the processing system 420, in a Step 530, can generate a topographical representation of the wireless telecommunications network. A topographical representation can be based, for example, on ground elevation information within a portion of the wireless network, e.g., a network cell, and/or other physical data associated with a portion of network, such as physical structures that might occlude a portion of the region served by a particular BTS. In a Step 540, the topographical representation is merged with the data to create an "overlay" of the data on the topographical representation and, in a Step 550, the overlay is displayed on video display terminal 430. By overlaying the data on the topographical representation, the data can be used to determine whether any deficiencies in system performance can be attributed to geographic features or physical structures in the vicinity of where an event is reported to have occurred. For example, if a network cell is experiencing frequent "dropped calls," the wireless network may selectively send requests to the wireless positioning system to provide location information for MSs as they travel through the cell. As calls are dropped in the cell, the last reported location for each MS experiencing a dropped call can be recorded. Over a period of sufficient time, a display of the location(s) of MSs experiencing dropped calls overlaid on the topographical representation of the network cell may indicate that all of the dropped calls were in a region of the cell occluded by a geographic feature or physical structure. Remedial steps can then be taken to improve the operation of the wireless telecommunications network in the identified region; for example, the operating characteristics of the existing cell can be altered, or a new cell can be installed in a location that will not be occluded by the geographic feature or physical structure.

The present invention provides significant advantages to wireless communications systems, in general, and the invention is particularly advantageous in cellular communications networks. The principles disclosed herein can satisfy not only the requirement that wireless telecommunications networks provide location information for wireless calls to public safety answering points (PSAPs), such as calls to "911," but can also make possible many advanced services, such as location-sensitive billing, vehicle and fleet management, and inventory/package monitoring. Furthermore, the principles disclosed herein can be used to improve the performance of a wireless telecommunications network by providing the capability to monitor and analyze characteristics of the network based on the location at which system anomalies occur. The capability to provide such advanced services and capabilities will allow service providers to recoup some of the investment that must be made to comply with the FCC/CTIA requirement for the geographic location of 911 calls and, thus, to maximize their return-on-investment.

Although the present invention has been described in detail, those skilled in the art will conceive of various changes, substitutions and alterations to the exemplary embodiments described herein without departing from the spirit and scope of the invention in its broadest form. The exemplary embodiments presented herein illustrate the principles of the invention and are not intended to be exhaustive or to limit the invention to the form disclosed; it is intended that the scope of the invention be defined by the claims appended hereto, and their equivalents.

What is claimed is:

1. An apparatus for use in determining a geographical location of a Mobile Station (MS) in a wireless telecommunications network having a Mobile Switching Center (MSC) serving said MS, said apparatus comprising:

an event detector integral to said MSC that triggers a request to a wireless positioning system upon detecting a predefined event associated with the origination, termination or quality of communications between said MS and said wireless telecommunications network, said wireless positioning system operable to determine and communicate said geographical location to said wireless telecommunications network in response to receiving said request; and a log for storing a plurality of records containing data associated with each occurrence of said predefined event.

2. The apparatus recited in claim 1, wherein said predefined event detected within said mobile switching center is selected from the group consisting of:

a predefined called number;

the origination of a wireless call by said MS;

the origination of a wireless call to said MS;

the termination of a wireless call by said MS;

the termination of a wireless call to said MS; and a user-definable event associated with said MS.

3. The apparatus recited in claim 1, wherein said event detector comprises a computer processing system.

4. The apparatus recited in claim 1, wherein said wireless telecommunications network comprises a Public Land Mobile Network (PLMN).

5. The apparatus recited in claim 1, wherein each of said records contain data selected from the group consisting of:
- the type of predefined event;
- the time of occurrence of the predefined event; and
- the geographical location of said MS at the time of occurrence of the predefined event.

6. The apparatus recited in claim 1, wherein said predefined event is associated with a threshold value of a parameter.

7. The apparatus recited in claim 6, wherein said parameter is selected from the group consisting of:
- a received signal strength associated with said MS;
- a bit error rate associated with said MS; and
- a rate of occurrence of said predefined event.

8. A method for determining a geographic location of a Mobile Station (MS) in a wireless telecommunications network, said method comprising the steps of:
- monitoring, using an event detector within a Mobile Switching Center (MSC) serving said MS, at least one parameter associated with the origination, termination or quality of communications between said MS and said wireless telecommunications network;
- requesting said geographic location of said MS upon detecting a predefined event associated with said at least one parameter;
- communicating said request for said geographic location of said MS to a wireless positioning system operable to determine and communicate said geographic location to said wireless telecommunications network; and
- storing a record containing data associated with each occurrence of said predefined event in a log.

9. The method recited in claim 8, wherein said predefined event is selected from the group consisting of:
- a predefined called number;
- the origination of a wireless call by said MS;
- the origination of a wireless call to said MS;
- the termination of a wireless call by said MS;
- the termination of a wireless call to said MS; and
- a user-definable event associated with said MS.

10. The method recited in claim 8, wherein said wireless telecommunications network comprises a Public Land Mobile Network (PLMN).

11. The method recited in claim 8, wherein said record contains data selected from the group consisting of:
- the type of predefined event;
- the time of occurrence of the predefined event; and
- the geographic location of said MS at the time of occurrence of the predefined event.

12. The method recited in claim 8, wherein said predefined event is associated with a threshold value of said at least one parameter.

13. The method recited in claim 8, wherein said parameter is selected from the group consisting of:
- a received signal strength associated with said MS;
- a bit error rate associated with said MS; and
- a rate of occurrence of said predefined event.

14. A system for monitoring and analyzing characteristics of a wireless telecommunications network associated with a particular Mobile Station (MS) being served by a particular mobile switching center, said system comprising:
- an event detector within said mobile switching center that triggers a request to a wireless positioning system upon detecting a predefined event associated with said MS, said wireless positioning system operable to determine and communicate a geographic location of said MS to said wireless telecommunications network in response to receiving said request; and
- a log for storing a plurality of records containing data associated with each occurrence of said predefined event.

15. The system recited in claim 14, further comprising a video terminal for displaying a graphical representation of said data.

16. The system recited in claim 15, wherein said graphical representation comprises an overlay of said data on a topographical representation of at least a portion of said wireless telecommunications network.

17. The system recited in claim 16, wherein said predefined event is selected from the group consisting of:
- a predefined called number;
- the origination of a wireless call by said MS;
- the origination of a wireless call to said MS;
- the termination of a wireless call by said MS;
- the termination of a wireless call to said MS; and
- a user-definable event associated with said MS.

18. The system recited in claim 16, wherein said event detector comprises a computer processing system.

19. The system recited in claim 16, wherein said wireless telecommunications network comprises a Public Land Mobile Network (PLMN).

20. The system recited in claim 16, wherein said predefined event is associated with a threshold value of a parameter.

21. The system recited in claim 20, wherein said parameter is selected from the group consisting of:
- a received signal strength associated with said MS;
- a bit error rate associated with said MS; and
- a rate of occurrence of said predefined event.

22. The system recited in claim 14, wherein each of said records contain data selected from the group consisting of:
- the type of predefined event;
- the time of occurrence of the predefined event; and
- the geographic location of said MS at the time of occurrence of the predefined event.

23. A system for determining a geographical location of a Mobile Station (MS) in a wireless telecommunications network, said system comprising:
- a wireless positioning system, said wireless positioning system operable to determine a geographic location of said MS independently of said wireless telecommunications network;
- a Mobile-Services Switching Center (MSC) comprising:
  - an event detector that triggers a request to said wireless positioning system upon detecting a predefined event associated with the origination, termination or quality of communications between said MS and said wireless telecommunications network, said wireless positioning system determining and communicating said geographic location of said MS to said wireless telecommunications network in response to receiving said request; and
  - a log for storing a plurality of records containing data associated with each occurrence of said predefined event.

24. The system recited in claim 23, wherein said predefined event is selected from the group consisting of:

a predefined called number;

the origination of a wireless call by said MS;

the origination of a wireless call to said MS;

the termination of a wireless call by said MS;

the termination of a wireless call to said MS; and a user-definable event associated with said MS.

25. The system recited in claim 23, wherein said event detector comprises a computer processing system.

26. The system recited in claim 23, wherein said wireless telecommunications network comprises a Public Land Mobile Network (PLMN).

27. The apparatus recited in claim 23, wherein each of said records contain data selected from the group consisting of:

the type of predefined event;

the time of occurrence of the predefined event; and the geographical location of said MS at the time of occurrence of the predefined event.

28. The system recited in claim 23, wherein said predefined event is associated with a threshold value of a parameter.

29. The system recited in claim 28, wherein said parameter is selected from the group consisting of:

a received signal strength associated with said MS;

a bit error rate associated with said MS; and a rate of occurrence of said predefined event.

30. The system recited in claim 23, further comprising a video terminal for displaying a graphical representation of said data.

31. The system recited in claim 30, wherein said graphical representation comprises an overlay of said data on a topographical representation of at least a portion of said wireless telecommunications network.

* * * * *